United States Patent [19]

Nabeshima

[11] 4,397,010

[45] Aug. 2, 1983

[54] OPTICAL SERVO-POSITIONING SYSTEM

[75] Inventor: Daiki Nabeshima, Kamakura, Japan

[73] Assignee: Tokyo Shibaura Denki Kabushiki Kaisha, Kawasaki, Japan

[21] Appl. No.: 272,767

[22] Filed: Jun. 11, 1981

[30] Foreign Application Priority Data

Jul. 9, 1980 [JP] Japan .................................. 55-93593

[51] Int. Cl.³ .......................... G11B 7/00; G11B 21/10
[52] U.S. Cl. ......................................... 369/44; 369/50; 360/77; 250/202
[58] Field of Search ..................... 369/44, 50, 45, 111, 369/124, 43; 358/128.5, 342; 360/77; 318/577; 250/202

[56] References Cited

U.S. PATENT DOCUMENTS 3,885,094  5/1975  Russell .................................. 369/44
3,932,700  1/1976  Snopko .................................. 369/44
4,118,735  10/1978 Wilkinson ........................... 365/124

OTHER PUBLICATIONS

"Video Disk Player Optics" by Bouwhuis et al., Jul. 1, 1978, vol. 17, No. 13, Applied Optics.

Primary Examiner—Alan Faber
Attorney, Agent, or Firm—Cushman, Darby & Cushman

[57] ABSTRACT

A servo-positioning system for controlling the positioning of a read-out light beam in an optical system which reads out digital information from a pre-recorded disc including a wobbling means for wobbling a read-out beam to traverse an information track of the disc, a photo detecting means for detecting the read-out beam reflected from the disc, a waveform arranging means for arranging the output of photo detecting means, an extracting means for extracting a clock signal component from the output of the waveform arranging means, a latch circuit for latching the output of the waveform arranging means synchronized with the output signal of the extracting means, a subtracting means for subtracting the output of the latch circuit from the output of the photo detecting means, to isolate the wobbling signal component from the output of the composite photo detecting means including an information component and a wobbling component.

8 Claims, 14 Drawing Figures

FIG. 2
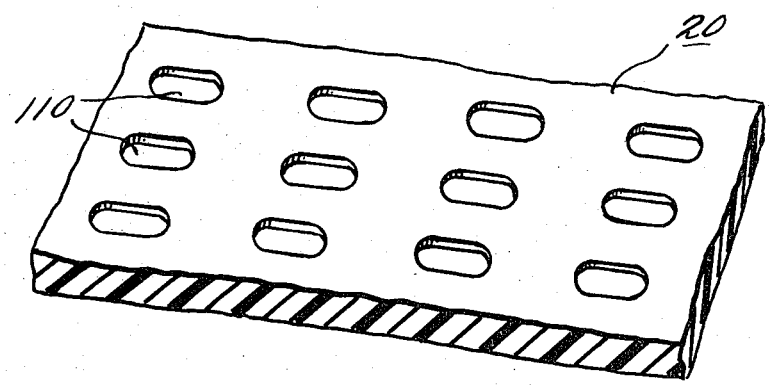
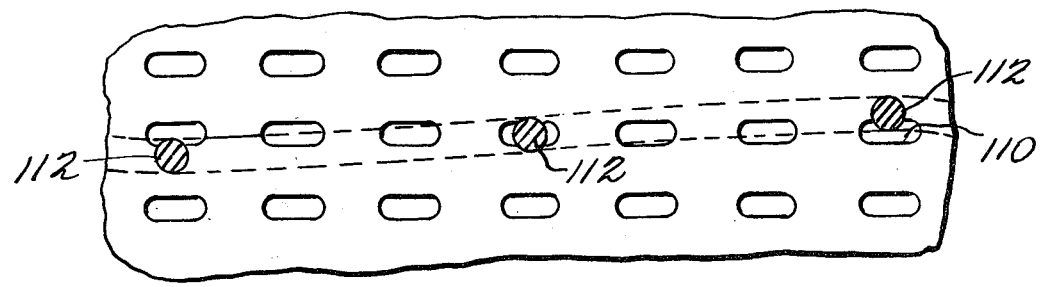
FIG. 3

OPTICAL SERVO-POSITIONING SYSTEM

BACKGROUND OF THE INVENTION

This invention relates to an optical servo-positioning system for positioning the read-out beam of an optical read-out system which reads out pre-recorded digital information from a recording medium such as a disc.

There has been a trend toward the development of digital recording and playback techniques. Video and audio signals previously recorded only in an analogue form, such as in conventional audio records or video tapes, are now being recorded in digital form on discs. Digital recording systems convert analogue information, such as, for example, an audio signal into digital information and then record that digital information onto a disc as "pits" forming a circular or spiral track of recorded information. The recorded information is read from a previously recorded disc by irradiating the spiral track with a read-out beam of convergent light, such as from a laser and then detecting the variation of a beam reflected from the disc.

In such optical digital information recording and read-out systems, it is an absolute necessity that the read-out beam be always accurately positioned over the data track being read so as to accurately sense the information recorded on the disc. This is sometimes referred to as maintaining the registration of the read-out beam.

Deviation of the incident read-out beam from the center of the track may cause the output of the reflected beam to be distorted or at too low an intensity to be sensed. As a result, the previously recorded information may not accurately read out. To prevent deviation or misregistration of the read-out beam, optical information read-out systems are usually provided with an optical servo-positioning system for positioning the spot of incidence of the read-out beam on the data track of the disc.

U.S. Pat. No. 4,118,735—Wilkinson—discloses a known optical servo-positioning system for positioning a read-out beam on a spiral data track. The system includes an articulated mirror for controlling the position of the light beam spot on the disc. An oscillator, which generates a low-frequency signal, drives the articulated mirror to wobble (dither) the spot so as to traverse the data track from one side of the track to the other with a very small lateral excursion. A photocell is positioned so as to detect a beam of light reflected from the data track. An output signal of the photocell includes error magnitude and direction information for the read-out beam. This magnitude and direction information is determined as a function of the phase relationship between the reflected light beam and the drive signal to the articulate mirror. If the beam is accurately centered, the intensity signal from the photocell is at a minimum. If the reflected beam is to the right of center of the data track, the intensity signal from the photocell increases, and, when multiplied by the driving signal, produces a product that has, for example, a positive value. However, if the reflected beam is to the left, the product of the intensity signal from the photocell and the driving signal has an opposite or negative value. Therefore, the direction of correction required is represented by the polarity of the multiplied signal while the amount of correction is represented by the articulate mirror.

However, known systems such as the Wilkinson system, discussed above, have the following problem. The wobbling frequency must be selected so as not to interfere with the information recorded on the disc. If the information recorded on the disc is a video signal which has the frequency spectrum of 1 to 5 MHz, the wobbling frequency of the servo-positioning system can be selected so as to be out of the video signal frequency spectrum band that is recorded, for example several 10 kHz. However, when the digital information recorded on the disc has an extended frequency spectrum range, such as from zero to several MHz, it is difficult to separate the wobbling signal from the pre-recorded signal so that they do not interfere with one another. Various modulation schemes such as NRZ (Non-Return to Zero), MFM (Modified Frequency Modulation), PM (Phase Modulation) and others are employed to convert an analogue signal into digital form for recording on a disc. These modulation systems have spectrum components in the low frequency band. Using known servo-positioning arrangements, a wobbling signal will interfere with these low frequency components. To prevent such interference, it would be necessary to degrade system performance by eliminating the low frequency components of the modulated digital data recorded on the disc.

SUMMARY OF THE INVENTION

Thus, it is an object of the present invention to provide an improved optical servo-positioning system for a digital information read-out system which can separate the wobbling signal component from the digital information read from the data track of a disc and accurately position the read-out beam on the center of the data track being read from the disc.

In accordance with a preferred embodiment of the invention, there is provided an optical servo-positioning system for an optical read-out system which reads digital information from a previously recorded track of a recording medium comprising a light source; an irradiating means for irradiating a light beam from the light source on the recording medium to read out the digital information recorded on the recording medium; an oscillator for oscillating a certain frequency signal; a wobbling means for wobbling the light beam to traverse an information track by the oscillated signal; a photo detecting means for detecting the light beam reflected from the recording medium and producing electric signal; a waveform arranging means for arranging the output of the photo-detecting means in a pulse signal with a constant amplitude; an extracting means for extracting a clock signal component from the output of the waveform arranging means, said clock signal being a basic signal to modulate the information; a latch circuit for latching the output of the waveform arranging means synchronizing with the output signal of the extracting means; a subtracting circuit for subtracting the output of the latch circuit from the output of the photo-detecting means; a detecting circuit for detecting the output of the subtracting circuit; and an adding means for adding the output of the detecting circuit and the output of the oscillator.

BRIEF DESCRIPTION OF THE DRAWINGS

The invention will be better understood from the following description taken in connection with the accompanying drawings, in which:

FIG. 2 shows an enlarged fragmentary perspective view of the disc track, illustrating information pits to be scanned by the light beam;

FIG. 3 shows the locus of the beam with respect to the track;

DETAILED DESCRIPTION OF THE PREFERRED EMBODIMENTS

Figure 1:
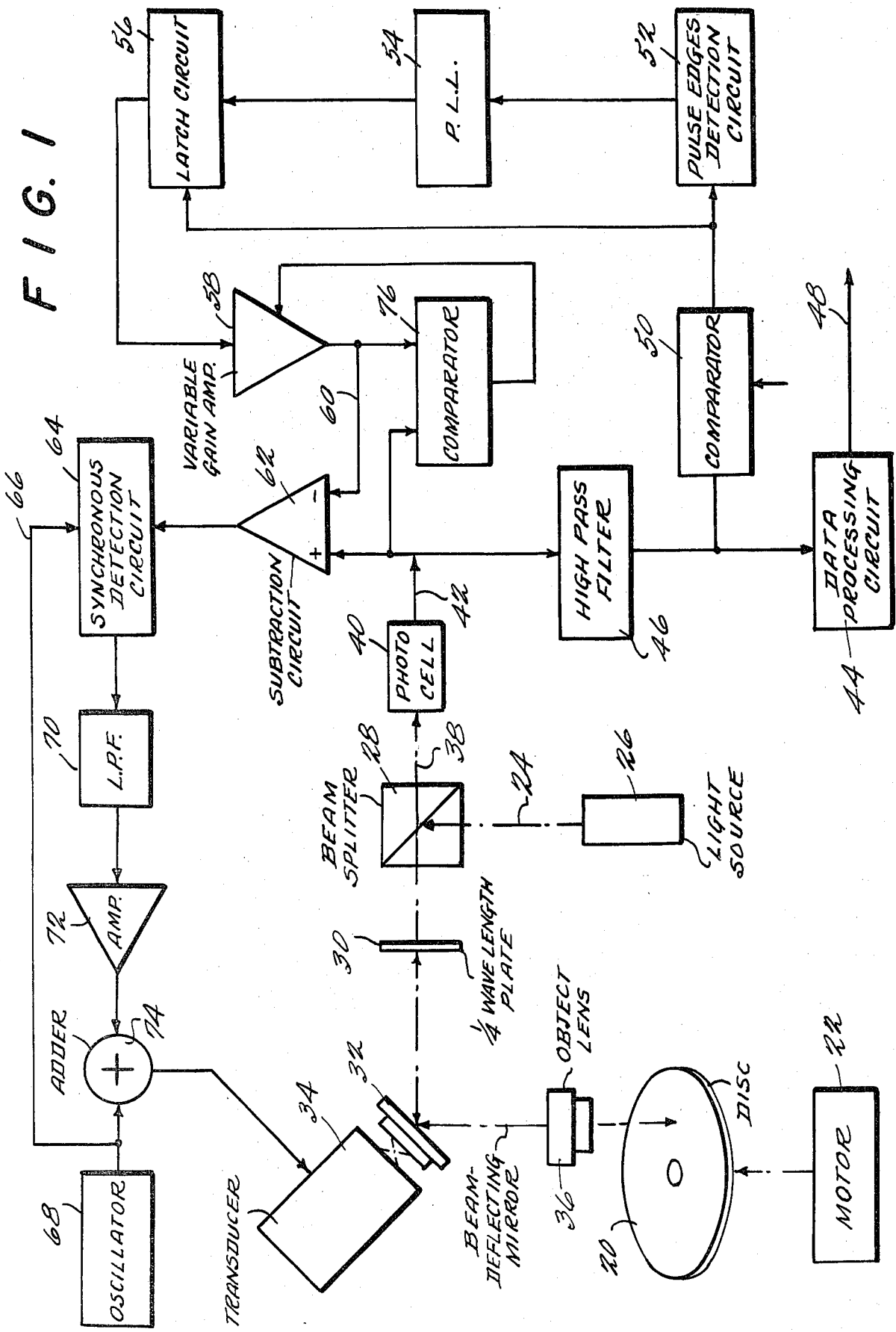
FIG. 1 schematically illustrates an optical digital information read-out system with an optical servo-positioning system according to the invention.

Referring now to the drawings, wherein like reference numerals represent identical or corresponding parts throughout the several views, and more particularly to FIG. 1, there is shown a block diagram of an optical digital information read-out system according to the present invention. The system is intended to read information from an information disc 20 rotated at a constant speed by a motor 22. The surface of disc 20 has, arranged in substantially circular or spiral tracks in which digital information representing, for example, an audio signal has been pre-recorded in form of a series of pits 110 as shown in FIG. 2.

The pre-recorded information is read out by directing a light beam 24 along an optical path from a light source 26, such as a laser, through a beam splitter 28 and a quarter-wavelength (λ/4) plate 30 for polarizing the light beam, into a movable beam-deflecting mirror 32 driven by a tracking transducer 34. From mirror 32, light beam 24 is directed to an object lens 36 and onto an information track of disc 20 consisting of a series of pits 110 in the surface of the disc as shown in FIG. 2.

Light beam 24 is wobbled so as to traverse the data track in response to an oscillating signal which is applied to transducer 34. The moving track is scanned by wobbling beam spot 112 as shown in FIG. 3. Light reflected from the surface of disc 20, at the point where the spot of beam 24 is incident, is gathered by objective lens 36 which returns the beam towards beam splitter 28 via beam-deflecting mirror 32 and quarter-wavelength (λ/4) plate 30.

Beam splitter 28 directs reflected light beam 38 towards a photocell 40 such as a photodiode. Reflected light beam 38 from information disc 20 includes the information recorded as pits on disc 20 in the form of an intensity modulation of light. Reflected beam 38 also includes a wobbling signal. Since the information is in the form of intensity modulation, it can be read out by detecting the intensity of the reflected light beam with photocell 40 to form electrical signals. An output signal 42 of photocell 40 is delivered to a data processing circuit 44 through an optional high pass filter 46. Data processing circuit 44 processes the signal 42 from photocell 40 to obtain an analogue audio signal 48 defined by the digital data pre-recorded on the disc in the form of pits 110.

The signal output of the high pass filter 46 is also delivered to a comparator 50 which detects whether or not the voltage level of the output from high pass filter 46 is higher than a predetermined threshold voltage level and generates a fixed amplitude pulse each time the threshold level is exceeded. This converts the signal output of high pass filter 46 into the pulse signal comprising a plurality of pulses of constant amplitude.

The output signal of comparator 50 is coupled to a pulse edges detection circuit 52. Pulse edges detection circuit 52 is used to detect the leading and the trailing edges of the output pulse signal from comparator 50 so as to obtain a clock signal component from the read-out information. The clock signal corresponds to a basic signal used to modulate the information. An output of pulse edges detection circuit 52 is delivered to a phase locked loop (PLL) circuit 54. PLL circuit 54 produces an output signal that is phase locked to the pulse signal from pulse edges detection circuit 52 so as to eliminate any jitter and to fill in any missing pulses. The output of PLL circuit 54 is delivered to a latch circuit 56. Latch circuit 56 comprises D-type flip-flop and latches the output signal from comparator 50 by the output of PLL circuit 54 as a timing clock. It is necessary that the output of PLL circuit 26 be delayed a certain period of time with respect to the output of comparator 50 to insure latching the output of comparator 50. PLL circuit 54 includes a delay circuit to produce a delayed output.

An output of latch circuit 56, which is the pure information not including wobbling signal component, is delivered to a variable gain amplifier 58 which adjusts the amplitude of the output of latch circuit 56. An output 60 of variable gain amplifier 58 is delivered to one input terminal of a subtraction circuit 62. Output 42 of photocell 40 is delivered to the other input terminal of subtraction circuit 62. Subtraction circuit 62 subtracts the output 60 of variable gain amplifier 58 from output 42 of photocell 40. Output 60 of variable gain amplifier 58 includes pure information without any wobbling signal component. Output 42 of photocell 40 includes the information and wobbling signal component. Therefore, an output of subtraction circuit 62 is the pure wobbling signal component.

In FIG. 1, a level comparator 76 may be employed. This level comparator 76 compares the outputs level of photocell 40 and variable gain amplifier 58 and then generates a gain control signal for controlling the gain of variable gain amplifier 58 to make the output level of variable gain amplifier 58 equal to the output level of photocell 40.

Also shown in FIG. 1, an automatic gain control (hereafter AGC) circuit may be employed, which controls to make the output level of variable gain amplifier 58 equal to the output level of photocell 40. The AGC circuit includes a level comparator 76 which compares the output level of photocell 40 and variable gain amplifier 58 and delivers its output as a gain control signal to variable gain amplifier 58.

According to the AGC circuit, the output level of variable gain amplifier 58 and photocell 40 may always coincide even if the output level of photocell 60 changes because of a different kind of disc.

Figure 4:
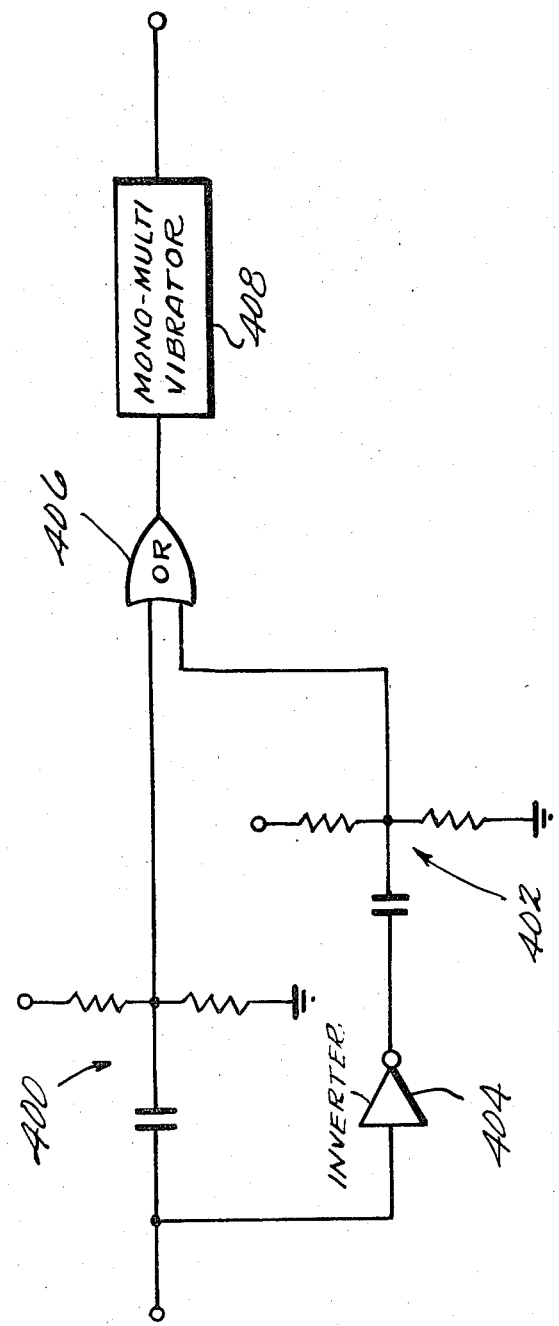
FIG. 4 shows an exemplary circuit of the pulse edge detection circuit shown in FIG. 1.

Referring now to FIG. 4, the pulse edges detection circuit 52 comprises a differential circuit 400 for differentiating the pulse to detect the leading edges thereof, a differential circuit 402 for differentiating the pulse inverted by an inverter 404 to detect the trailing edges thereof, an OR gate 406 for getting positive pulses, for example, from the output of the differential circuits 400 and 402, and a mono-multivibrator 408 which may be triggered by the outputs of differential circuits 400 and 402.

Figure 5A:
FIG. 5, consisting of 5A–5H, shows a graphical representation of voltage wave forms as they appear under certain conditions of operation of the subject invention.
Figure 5B:
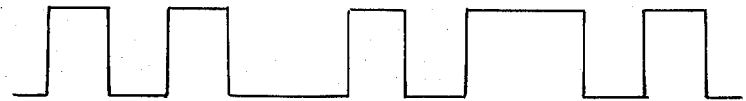
Figure 5C:

FIGS. 5A to 5H show waveforms for explaining the signal processing that occurs from comparator circuit 50 to subtraction circuit 62 of FIG. 1. FIG. 5A represents the basic clock pulses used in recording the information onto disc 20. The FIG. 5B waveform represents digital information which is generated synchronously with the clock pulse shown in FIG. 5A and recorded on the disc 20. The FIG. 5C waveform represents the output of photocell 40 as the digital information is read out by the wobbling light beam. The signal includes not only the digital information, but also a wobbling signal envelope.

Figure 5D:
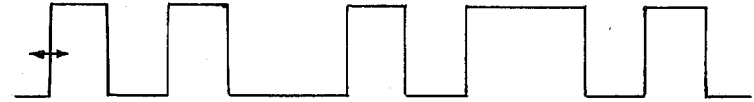
Figure 5E:
Figure 5F:
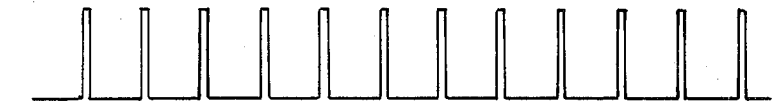
Figure 5G:
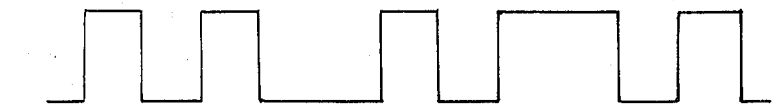

The output of photocell 40 is delivered, via optional high pass filter 46, to comparator 50. Comparator 50 detects whether or not the voltage level of the output from photocell 40 is higher than the predetermined threshold voltage level and produces the pulse signal with a constant amplitude as shown in FIG. 5D. In essence, comparator 50 eliminates the wobbling envelope, leaving only the digital information signal. The output of comparator 50 is delivered to pulse edges detection circuit 52. Pulse edges detection circuit 52 produces a narrow pulse, as shown in FIG. 5E, whenever it detects a pulse edges of the output signal of comparator 50. The output of pulse edges detection circuit 52, which includes jitter and may not include a pulse corresponding to every original clock pulse, is delivered to PLL circuit 54. PLL circuit 54 eliminates the jitter and supplies missing pulses. As a result, the output of PLL circuit 54, as shown in FIG. 5F, is a stable clock signal without any jitter and with all clock pulses. The output of PLL circuit 54 is delivered to latch circuit 56.

Figure 5H:

Latch circuit 56 latches the output of comparator 50 responsive to the clock pulses from PLL circuit 54. As a result, the output of latch circuit 56 is a pure digital information signal having constant amplitude without any jitter and without any wobbling signal component. The output of latch circuit 56 is delivered to subtraction circuit 62 through variable gain controlled amplifier 58. Subtraction circuit 62 subtracts the gain adjusted output of latch circuit 56 shown in FIG. 5G from the output of photodiode 40 (see FIG. 5C). Therefore, the output of subtraction circuit 62 represents only pure wobbling signal component as shown in FIG. 5H.

In this manner, the wobbling signal component in its pure form is extracted from the output of photocell 40. This pure wobbling signal can be used to accurately position the read-out beam over the data track being read.

Referring again to FIG. 1, the output of subtraction circuit 62 is delivered to a synchronous detection circuit 64. Synchronous detection circuit 64 detects the output of subtraction circuit 62 in accordance with an output signal from an oscillator 68 which provides an oscillating signal for wobbling the beam-deflection mirror 32. An output of synchronous detection circuit 64 is delivered to an adder circuit 74 through a low pass filter 70 and an amplifier 72. Adder circuit 74 adds the output of amplifier 72 and the output 66 of oscillator 68, and then delivers the added signal to transducer 34. This signal, applied to transducer 34 includes the wobbling signal generated by oscillator 68 and an error signal component for correcting misregistration, the error component being generated by synchronous detection circuit 64, low pass filter 70 and amplifier 72.

Figure 6:
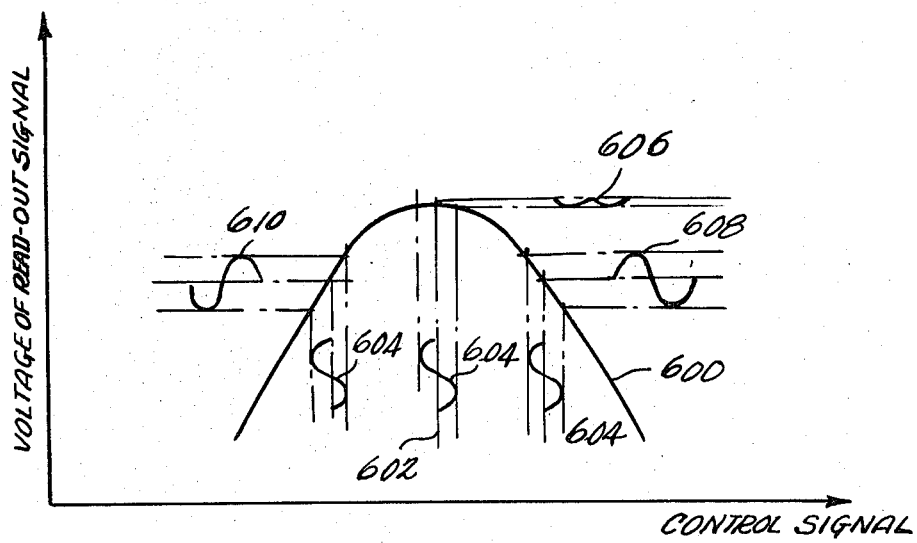
FIG. 6 shows a graphical representation of voltage waveforms as they appear under certain conditions of operation of the present invention.

Referring now to FIG. 6, a curve 600 represents the output of photocell 40 when the light beam is at various positions in the vicinity of the center 402 of the data track. When the beam is positioned directly over center line 602, the voltage produced therein is a maximum; but, as it moves either to the right or left of center line 602, the voltage produced therein is reduced. Therefore, when the center of the beam wobble 604 is positioned over center line 602, the output of subtraction circuit 62 is a waveform with small change of the amplitude shown by curve 606. But when the center of the beam wobble 604 is positioned either over the right or left of center line 602, the output of subtraction circuit 62 is a waveform with large change of the amplitude shown by curve 608 or 610. In addition, the output waveform 608 is phase inverted to the output waveform 610.

Figure 7:
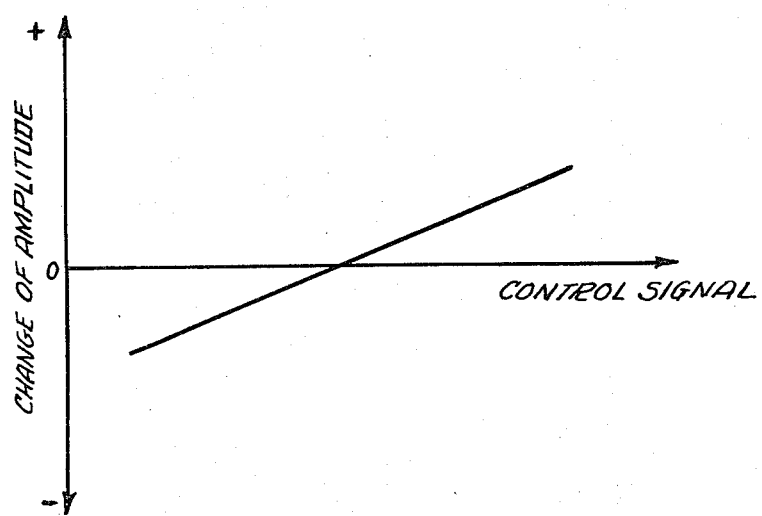
FIG. 7 shows a relation between the change of amplitude of the read-out signal and the voltage of the control signal.

Therefore, a correction (error) signal for correcting the beam position is produced by detecting the output of subtraction circuit 62 shown in FIG. 7. The correction signal, combined with the oscillation output, is applied to the transducer 34 which drives the mirror 32, the latter being operable to deflect the light beam 24 in accordance with the correction signal. Thus, the beam position is always automatically adjusted to position over the center of the information track being read out.

As above-mentioned, according to the invention, only the wobbling signal component is accurately separated from the photocell signal which includes digital information and the wobbling signal component. By accurately separating the wobbling component, tracking control is very steady and the digital information is read out accurately.

Many changes and modifications in the above described embodiments, can, of course, be carried out without departing from the scope of the present invention, that invention intended to be limited only by the scope of the appended claims.

What is claimed is:

1. A servo-positioning system for controlling the positioning of a read-out light beam in a system which reads pre-recorded digital information from a recording medium comprising:

means for generating a read-out light beam;

an oscillator for generating a wobbling signal at a predetermined frequency;

wobbling means, responsive to a control signal, for directing said read-out beam onto a data track of said medium and wobbling the read-out beam to about a center line of said track at said predetermined frequency;

photo detecting means for detecting a light beam reflected from the recording medium and producing a photocell signal responsive to the detected light beam, the photocell signal including both information and wobbling signal components;

waveform arranging means for generating, in response to said photocell signal, a pulse signal having a plurality of pulses, each with a constant amplitude representing substantially said information component;

extracting means for generating a clock signal synchronized with the output of the waveform arranging means;

a latch circuit for latching an output of the waveform arranging means responsive to the output signal of the extracting means to produce a latch signal including only said information component;

a subtracting circuit for subtracting said latch signal from the photocell signal to provide a subtraction signal having only said wobbling component;

a detecting circuit for detecting the output of the subtracting circuit and producing an error signal; and adding means for adding the error signal to said wobbling signal to produce said control signal.

2. A servo-positioning system according to claim 1 in which said wobbling means comprises a transducer for converting the output signal of said oscillator into mechanical vibration, and a beam-deflecting mirror disposed on the transducer.

3. A servo-positioning system according to claim 1, in which said waveform arranging means comprises a comparator for comparing the output voltage level of the photo detecting means with a predetermined voltage level to convert the photocell signal to said pulse signal.

4. A servo-positioning system according to claim 1, further comprising a variable gain amplifier which controls the gain of the latch signal so as to coincide with the output level of the photo detecting means.

5. A servo-positioning system according to claim 1, further comprising a variable gain amplifier for amplifying the latch signal, a comparator for comparing the output level of the variable gain amplifier with the photocell signal, and means for controlling the gain of the variable gain amplifier so as to adjust the level of the latch signal to coincide with the level of the photocell signal.

6. A servo-positioning system for controlling the positioning of a read-out light beam in a system which reads prerecorded digital information from a recording medium comprising:

means for generating a read-out light beam;

an oscillator for generating a wobbling signal at a predetermined frequency;

wobbling means, responsive to a control signal, for directing said read-out beam onto a data track of said medium and wobbling the read-out beam about a center line of said track at said predetermined frequency;

photo detecting means for detecting a light beam reflected from the recording medium and producing a photocell signal responsive to the detected light beam, the photocell signal including both information read from the data track and a wobbling signal component;

waveform arranging means for generating, in response to said photocell signal, a pulse signal having a plurality of pulses, each pulse having a constant amplitude, said pulse signal representing substantially said information component;

extracting means for generating a clock signal synchronized with the output of the waveform arranging means, said extracting means comprising a pulse edge detecting circuit for detecting the leading and trailing edges of the pulse signal and a phase locked loop circuit for generating said clock signal synchronized with an output of said pulse edges detecting circuit;

a latching circuit for latching an output of the waveform arranging means responsive to the output signal of the extracting means to produce a latch signal including only said information component;

a subtracting circuit for subtracting said latch signal from the photocell signal to provide a subtraction signal having only said wobbling component;

a detecting circuit for detecting the output of the subtracting circuit and producing an error signal; and adding means for adding the error signal to said wobbling signal to produce said control signal.

7. A servo-positioning system according to claim 6, further comprising a variable gain amplifier for controlling the amplitude of the latch signal so as to coincide with the output level of the photo detecting means.

8. A servo-positioning system according to claim 6 further comprising a variable gain amplifier for amplifying the latch signal, a comparator for comparing the output level of the variable gain amplifier with the photocell signal, and means for controlling the gain of the variable gain amplifier so as to adjust the level of the latch signal to coincide with the level of the photocell signal.

* * * * *